United States Patent [19]

Vogel

[11] Patent Number: 5,446,488

[45] Date of Patent: *Aug. 29, 1995

[54] TELEVISION PROGRAMME DISTRIBUTION SIGNAL HAVING THE CAPABILITY TO SELECTIVELY BLOCK NON-PROGRAMME MATERIAL

[76] Inventor: Peter S. Vogel, Locked Bag 1, Springwood, N.S.W. 2777, Australia

[*] Notice: The portion of the term of this patent subsequent to Mar. 29, 2010 has been disclaimed.

[21] Appl. No.: 689,824

[22] PCT Filed: Sep. 29, 1989

[86] PCT No.: PCT/AU89/00423

§ 371 Date: Sep. 22, 1993

§ 102(e) Date: Sep. 22, 1993

[87] PCT Pub. No.: WO90/03706

PCT Pub. Date: Apr. 5, 1990

[30] Foreign Application Priority Data

Sep. 30, 1988 [AU] Australia ................... PJ0706

[51] Int. Cl.[6] .............................................. H04N 7/08
[52] U.S. Cl. ........................................ 348/3; 348/460; 358/908; 358/335
[58] Field of Search .................... 380/11, 10; 358/908, 358/85, 335; 348/460, 907, 906; 455/4.1, 4.2, 2; 379/93, 100; 360/33.6; H04N 7/14, 7/16, 7/167, 7/08, 7/087, 5/44, 5/76, 5/78, 5/782

[56] References Cited

U.S. PATENT DOCUMENTS

| | | | |
|---|---|---|---|
| 4,605,964 | 8/1986 | Chavel | 358/147 |
| 4,635,121 | 1/1987 | Goffman | 358/188 |
| 4,787,063 | 11/1988 | Muguet | 358/33.6 |
| 4,864,429 | 9/1989 | Eigeldinger et al. | 358/349 |

FOREIGN PATENT DOCUMENTS

| | | | |
|---|---|---|---|
| 0243312 | 10/1987 | European Pat. Off. | H04N 7/16 |
| 0103890 | 6/1985 | Japan | 358/85 |
| 0166288 | 7/1986 | Japan | H04N 7/173 |
| 0287391 | 12/1986 | Japan | H04N 7/16 |
| 2194659 | 3/1988 | United Kingdom | H04N 7/16 |

*Primary Examiner*—James J. Groody
*Assistant Examiner*—David E. Harvey
*Attorney, Agent, or Firm*—Cushman, Darby & Cushman

[57] ABSTRACT

Television programs interupted by non-program material, such as commercials, are broadcasted by the disclosed system over standard TV channels. An ecrypted indicating signal is also broadcasted by the system such that the ecrypted signal can be received and decrypted at authorized viewer locations to provide program identifying information. Each of the authorized viewer locations includes a credit store for storing data representing an available credit. Each authorized location also includes means for editing the viewing/recording of received program signals based on the provided program identifying information when the data in said credit store indicates that credit is available. The available credit represented by the stored data is consumed in response to the usage the means for editing program signals.

36 Claims, 3 Drawing Sheets

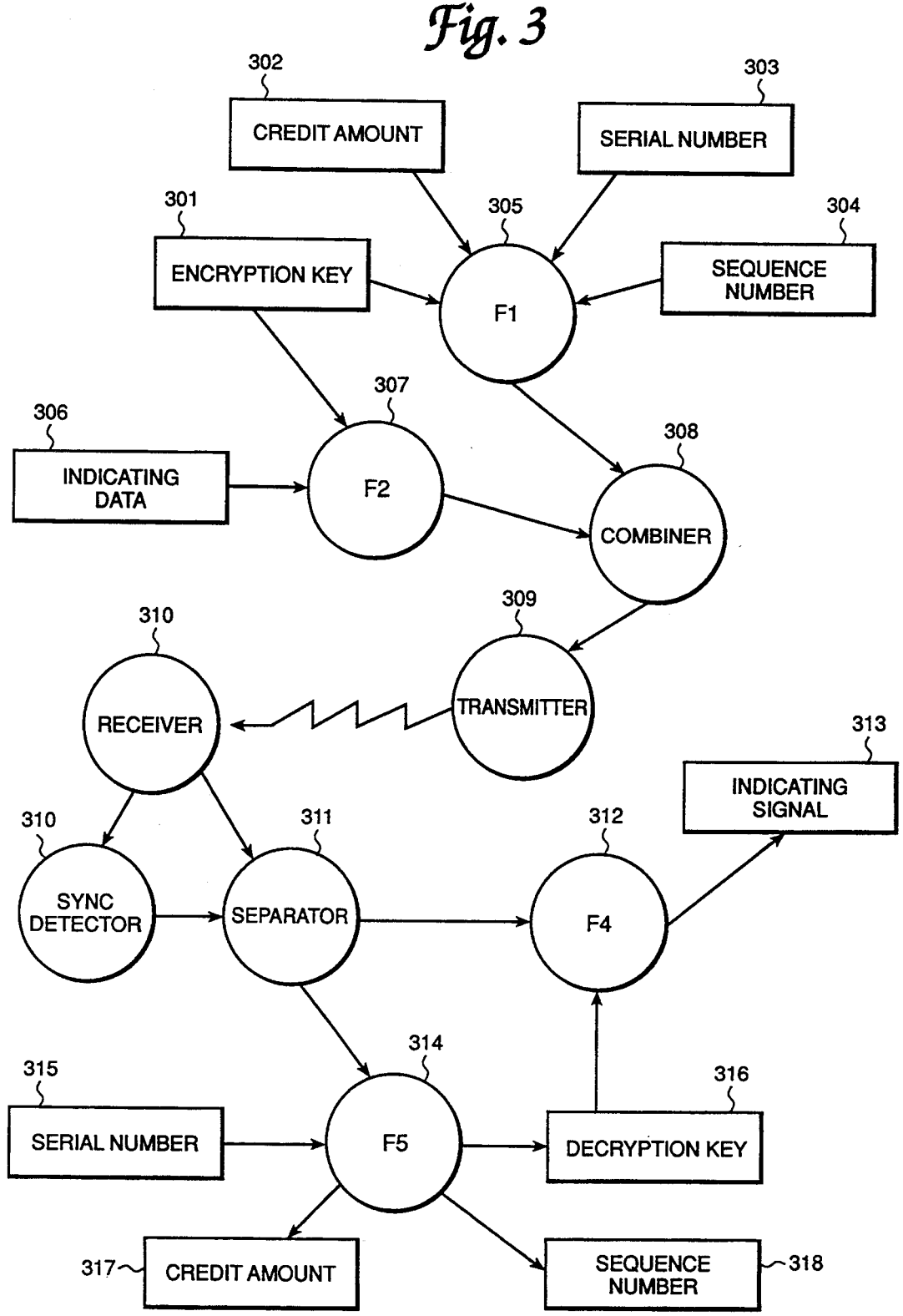

TELEVISION PROGRAMME DISTRIBUTION SIGNAL HAVING THE CAPABILITY TO SELECTIVELY BLOCK NON-PROGRAMME MATERIAL

TECHNICAL FIELD

The present invention relates to methods of, and apparatus for, distributing and viewing television programmes and for recording television programmes for later replay.

BACKGROUND ART

In recent years it has become common for consumers of television broadcasts to make use of video recording devices (commonly known as videocassette recorders or VCRs) to make recordings of television programmes for their own use. One of the most common uses of the domestic VCR is to record a television programme which is being broadcast at a time when it is inconvenient for the householder to watch television, or at a time when the householder is occupied watching another desired programme on a different channel. The programme is recorded without necessarily being viewed at the time of recording, being replayed for viewing at a more convenient time. This process is commonly called time-shifted viewing.

One limitation of the prior-art time-shifted viewing method is that many programmes are broadcast with interruptions, such as non-programmes material, which may detract from the viewer's enjoyment. Non-programme material includes commercial messages, half-time breaks at sporting fixtures, editorial commentary during movies, station identifications and other material not essential to the programme. Interruptions of this nature are one significant reason why alternative methods are often chosen for viewing movies in particular, such as rental of pre-recorded interruption-free movies, or subscription television services which provide interruption free movies for a fee.

These methods also suffer limitations. Rental movies incur the inconvenience of having to physically collect the tape from a video library and return it after viewing, are costly compared to recording off-air, and can only be viewed over the relatively short period of time for which the tape is rented. Subscription services are generally of the pay-per-view type, in which the viewer pays a fee for each movie viewed, or time-based subscription, where the user pays a periodical fee for access to the service for a prescribed time, during which it can be utilised as much as desired. Both these types of subscription service require a complex and expensive distribution infrastructure and are expensive to operate, resulting in high cost to the consumer. One major problem with subscription television services is piracy, that is, the utilisation of free-to-air or cable signals by people who are not subscribers. Piracy is a cause of considerable financial loss to service providers, and much effort has been devoted to securing subscription or pay-per-view services against such abuse. The primary scheme for preventing piracy is to encrypt broadcasts in such a way as to render the signals unwatchable except with the aid of decoders available only to legitimate viewers. It is now also commonplace for such decoders to be equipped with control means which enable the service provider to enable or disable decoding from a central office, providing means of ensuring that individual subscribers cannot continue to use their decoders unless they have paid for the service, for example by monthly subscription. A further well-known extension of the system is the pay-per-view arrangement, whereby the charge for the service is based on usage. One charging method for pay-per-view involves issuing each user a certain number of credits in the form of data stored in the decoder. A predetermined number of these credits are consumed each time the user selects a programme to be decoded, and when all credits are consumed, the decoder ceases to function and the user must purchase further credits. For convenience credits can be issued by transmitting appropriate data to the decoder over the air or cable.

One limitation of such subscription services is that the equipment required to deliver programmes, encrypt and decode the programme signals, and manage the charging system is complex and expensive.

A further limitation of subscription services is that because many viewers prefer to watch programmes including interruptions rather than pay for viewing in cash, the demand for subscription services is not universal and hence both commercial and commercial-free systems must co-exist, with associated duplication of expensive resources.

A further difficulty for service providers which arises from the use of VCRs for time-shifted viewing of commercial television broadcasts is that users often use the fast-forward facility of a VCR to skip quickly through commercial messages on replay. This process, called "zipping", is of great concern to advertisers, who are paying to have their commercials broadcast at a rate based on the number of viewers. Because it is impossible to know how many viewers are zipping commercials, advertisers are often incorrectly charged.

The presence of non-programme material is also a cause of annoyance to many television viewers watching the programme as it is broadcast. A number of schemes have been proposed for eliminating unwanted material, in particular commercials, from television programmes being recorded or viewed. One approach uses an indicating signal transmitted from the same source as the television programme. An example of this scheme is apparatus manufactured by Logica Communications and Electronic Systems, London, known as an Advertisement Display Control Unit (ADCU). This equipment is intended for use with cable television systems for the purpose of eliminating advertisements in certain countries, where they are not permitted. Advertisements are indicated by a prescribed signal inserted into one line of the vertical interval of the television signal. On detection of this signal at a cable head end, the ADCU interrupts distribution of the transmission to viewers' homes, and substitutes a page of teletext vision, until such time as the advertisement is finished as indicated by the appropriate signal. While this scheme is effective for the purpose of controlling commercials on a country-by-country basis, it is designed to allow control of commercial-deletion from the point of origin of the broadcast, and does not allow individual viewers to choose whether or not they receive the commercials. Although it would be possible to adapt the system for domestic use, it would not be successful because broadcasters would lose considerable advertising revenue since it can be expected that many viewers would disable advertisements even in countries where television advertising is permitted. Without the cooperation of the broadcasters, who are required to transmit the signal indicating the presence of advertisements, this system can not work. Another scheme for eliminating unwanted material, which does not suffer this particular limitation, is described by Von Kohorn in U.S. Pat. No. 4,520,404.

According to this method, a monitoring station is provided where a person watches programmes received off-air and activates a transmitter which sends command signals indicating the presence of non-programme material to viewers' homes at the appropriate moments. The command signals are received separately from the television programme being viewed or recorded and utilised by a controller adapted to black out television display or pause recording while unwanted material is being received. Although this scheme is effective in achieving the object of allowing viewers to edit out unwanted material from broadcasts, it suffers from a number of shortcomings. In particular, the system does not provide a method of charging users on a basis of usage, nor is it possible to ascertain how many viewers are editing out commercials, since so long as the viewer is equipped with the editing system, it can be used as much or as little as desired.

The present invention is directed towards providing new and useful alternatives to known television programme distribution, editing and viewing arrangements.

According to prior-art television distribution systems, programmes are either encrypted and broadcast without commercials, in which case viewers must pay to be able to receive and decode these programmes, or programmes are transmitted in a form anyone can receive and view without payment, in which case the programmes are generally interrupted by commercials. According to this invention, programmes are transmitted unencrypted and with commercials and a signal indicating the presence of non-programme material is also transmitted, viewers being provided with controllers which cause elimination of unwanted material from viewing or recording. In this respect, the system is similar to that of Von Kohorn's U.S. Pat. No. 4,520,404. However the present invention further provides a system for enabling the elimination of unwanted material only while pre-purchased credit remains. Alternatively, the indicating signal can be embedded in the broadcast signal, for example in the manner of the Logica ADCU. In this case also, the present invention provides for revenue-control.

The present invention, therefore provides a significant benefit over the prior art in that members of the viewing public can choose whether they wish to view programmes, for example movies, free of charge but with interruptions, or to view programmes free of interruptions, but to pay a charge. One significant functional difference between the well known pay-per-view system and that of this invention is that whereas in the case of pay-per-view the viewer pays to receive or record a particular programme, in the case of this invention the viewer pays in order not to see or record certain material. This is of benefit to the viewer, in that the additional service is offered but does not interfere with the provision of the conventional commercial service, as the broadcast need not be encrypted since it is intended that anyone be able to receive it without charge. The invention is advantageous also to the broadcaster, as it allows provision of an additional service, and source of additional revenue, not unlike pay-per-view service, at very little capital or running cost. The invention is also beneficial to the advertisers who purchase advertising time during broadcasts as it allows the audience not watching the commercials to be more accurately assessed, so that advertisers can have greater confidence that the audience for which they are paying is being delivered. The advertisers also benefit in that the invention makes it less attractive to manually zap recordings, that is, remove commercials by manually pausing the VCR when recording a programme, or fast-forwarding through commercials when replaying.

DISCLOSURE OF INVENTION

According to a first aspect of the present invention there is provided a method of distributing television programmes comprising the steps of broadcasting a television signal for a programme interrupted by non-programme material, encrypting a signal indicating broadcast of non-programme material, transmitting said encrypted indicating signal, receiving both signals at a receiving station, recording the received programme, testing stored data indicating whether the user has been previously authorised to use the invention at that time and, if the user has been previously authorised to use the invention at that time, decrypting the received indicating signal, and if the decrypted indicating signal indicates reception of non-programmne material, pausing the recording of the programme until such time as an indicating signal indicating cessation of non-programme material is received. The term "previously authorised" as used herein refers to payment for, or commitment to pay for, use of the service, such payment or commitment having been made prior to use.

According to a further extension of the invention, the invention further comprises a method of charging for the removal of unwanted programme material, namely storing data representative of an amount of credit purchased by the user, disabling the recording control function of the invention if the credit falls below a predetermined amount, and reducing the amount of credit stored by an amount proportional to the duration of unwanted programme material removed. In another aspect, the credit amount is reduced by a predetermined amount each time recording is paused, so that charging is based on the number of times unwanted material is eliminated, rather than the cumulative duration of eliminated material.

In other aspects, the invention also comprises the indicating signal receiver and controller used in carrying out the methods described above.

In another aspect, the present invention provides television programme distribution means comprising means for broadcasting a television signal for a programme interrupted by non-programme material, means for encrypting in a secure manner a signal indicating broadcast of non-programme material, means for transmitting said encrypted indicating signal, means for receiving both signals at a receiving station, means for recording the received programme, means for decrypting the received indicating signal, control means adapted to determine whether the user has been previously authorised to use the invention at that time and, if this condition is satisfied, and if the decrypted indicating signal indicates reception of non-programme material, to pause the recording of the programme until such time as an indicating signal indicating cessation of non-programme material is received. Other aspects of the invention further provide means for charging for elimination of unwanted programme material, according to the methods of charging per use or charging for duration described above.

In accordance with another useful extension, any of the foregoing aspects of the invention can be beneficially adapted to cause display of a television programme to be disabled when unwanted material is being broadcast, utilising indicating signal, encryption, authorisation and charging schemes as described in relation to control of recording of programmes.

A further beneficial embodiment of the invention includes means for recording and reporting usage of the invention in terms of time, date and channel being received, this information being available to the service providers for gathering statistics which are of use to the service providers, broadcasters, advertisers and others.

BRIEF DESCRIPTION OF DRAWINGS

Some embodiments of the invention will now be described, by way of example only, with reference to the drawings in which:

FIG. 3 is a schematic diagram illustrating the information flows within the invention.

MODE FOR CARRYING OUT THE INVENTION

Figure 1:
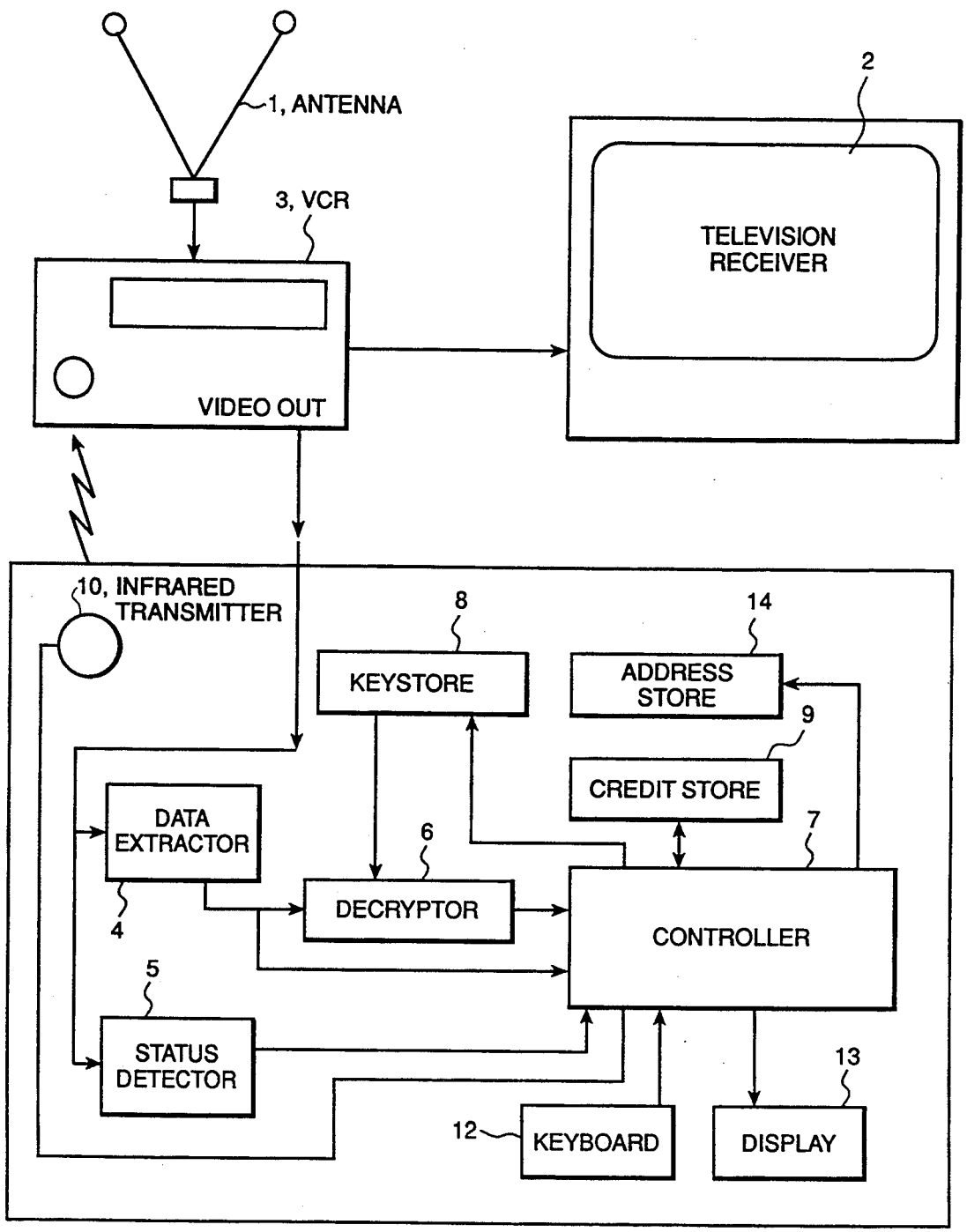
FIG. 1 is a block diagram of an embodiment in which the indicating signal is embedded into the programme broadcast.

Referring to FIG. 1, broadcast signals are received by antenna 1, and passed via VCR 3 to television receiver 2, where they can be viewed in the conventional manner. The video output of VCR 3 includes a composite video signal, including in its vertical blanking interval a signal indicating the type of material being received. In this embodiment, the indicating signal is embedded into the broadcast vertical interval of the synchronising signal by the broadcaster. The indicating signal may be present continuously, or only during certain times, as desired by the broadcaster. Typically, the indicating signal would be present during broadcast of movies or drama, and would indicate whether the current broadcast is programme or non-programme material. The indicating signal is transmitted repeatedly and frequently, a minimum of once per second in this embodiment, so that proper operation can be ensured from the moment of enabling the system at a particular user's station. It may also be desirable to transmit the indicating signal about one second in advance of changes in type, to allow for response time of recording equipment.

The indicating signal is also encrypted to prevent utilisation by unauthorised persons. The output of VCR 3 is fed to data extractor 4, which senses the appropriate line of the vertical interval and extracts the signal located therein, presenting the extracted signal to decryptor 6 and controller 7. Decryptor 6 applies a key from keystore 8 to the extracted data, resulting in a decrypted signal being fed to controller 7. As well as signals indicating programme or non-programme material, the signals embedded in the broadcast, and hence presented to controller 7 from decryptor 6, include signals used for controlling credit and security, hereinafter referred to as accounting signals. The credit control function is provided as follows. Usage of the service is provided on a basis of payment per time unit of non-programme elimination. The user purchases a given duration of service, for example 100 minutes, by placing an order with the service provider (in this case the broadcaster). This is conveniently performed by phoning a central office, requesting the desired amount of service, quoting a subscriber number, and authorising charging to a credit card. The central office then transmits, via the vertical interval signalling means, an accounting signal which includes a serial number unique to that subscriber, a signal indicating the number of minutes credit to be granted, and a sequence number. Controller 7, on recognising these signals, compares the address signal to the address stored in address store 14, and if the address matches, increments credit store 9 by this number of minutes. The security function operates by allowing the service provider to change the decryption key in the keystore periodically to provide further security. Accounting signals used, in this embodiment are also encrypted.

The encryption and decryption technique employed in this invention can be any of the many well-known techniques commonly used for controlling access to data or programmes by authorised subscribers only. The scheme utilised by this embodiment of the invention is described in detail below, with reference to FIG. 3.

Referring again to FIG. 1, to use the invention for eliminating unwanted non-programme material from a given recording, the user enables the device using keyboard 12. Keyboard 12 in this embodiment is a pushbutton switch array which sends data to controller 7. Some choices can be made according to prompts issued by controller 7 via display 13. Choices can include selection of a mode whereby suppression of unwanted material only takes place during the desired programme, and not immediately preceding or after it. This is useful in conserving credit units in cases where the user does not mind the non-programme material surrounding the recorded programme. Timer functions can also be offered, for starting and stopping the controlling action at preset times of day.

Once enabled, controller 7 monitors signals from decryptor 6, and on recognition of a non-programme material signal, causes infrared transmitter 10 to send a PAUSE code to VCR 3, which has been previously set into RECORD mode, either by the user or by the generation of suitable infrared signals by this invention. Recording is thereby suspended for the duration of non-programme material, after which a resumption signal is detected by controller 7 and a signal suitable for causing resumption of recording is transmitted to VCR 3 by infrared transmitter 10. Controller 7 also measures the duration of the non-programme material eliminated, and decrements credit store 9 by a corresponding amount. If credit store 9 reaches zero, further operation of the elimination function is inhibited, and a suitable message is transmitted to the user via display 13. The user must then purchase further credit as described above. This method of decrementing credit store 9 is chosen for convenience only, and other methods can be used with good results. For example, controller 7 can be arranged to decrement credit store 9 by a fixed amount each time non-programme material is selected and recording is suspended, so that consumption of credit is a function of number of suspensions rather than duration of suspensions.

Display 13 in this embodiment is a liquid crystal display mounted on the enclosure of the apparatus of the invention. It is also used to indicate, on request via keyboard 12, credit units remaining. In some cases, the service provider might transmit labelling information along with the other indicating signals, such labelling signals indicating the title of programmes as they are broadcast. These labels can be displayed by display 13, or used to control VCR 3 so that recording can be initiated or terminated automatically on commencement or completion of a programme, specified by name by the user. Display 13 can be other display means, such as a character generator producing messages visible on the television screen.

Status detector 5 of this embodiment is provided to enable controller 7 to sense the operational status of VCR 3. Status detector 5 comprises sensing circuitry adapted to sense presence of video signal, and optionally also to determine whether the signal indicates that VCR 3 is in play mode, pause mode or fast spooling mode. The detected status is used by controller 7 to ensure that control signals transmitted to VCR 3 are the correct ones for achieving the desired control functions. For example, in the case of some VCRs, a PAUSE signal received will have different effects depending on the current status of the VCR transport. The absence of video signal can also be used by controller 7 as an indication that the VCR is not operating, so that an OPERATE command can be sent to it, or a warning signal can be generated to alert the user.

Figure 2:
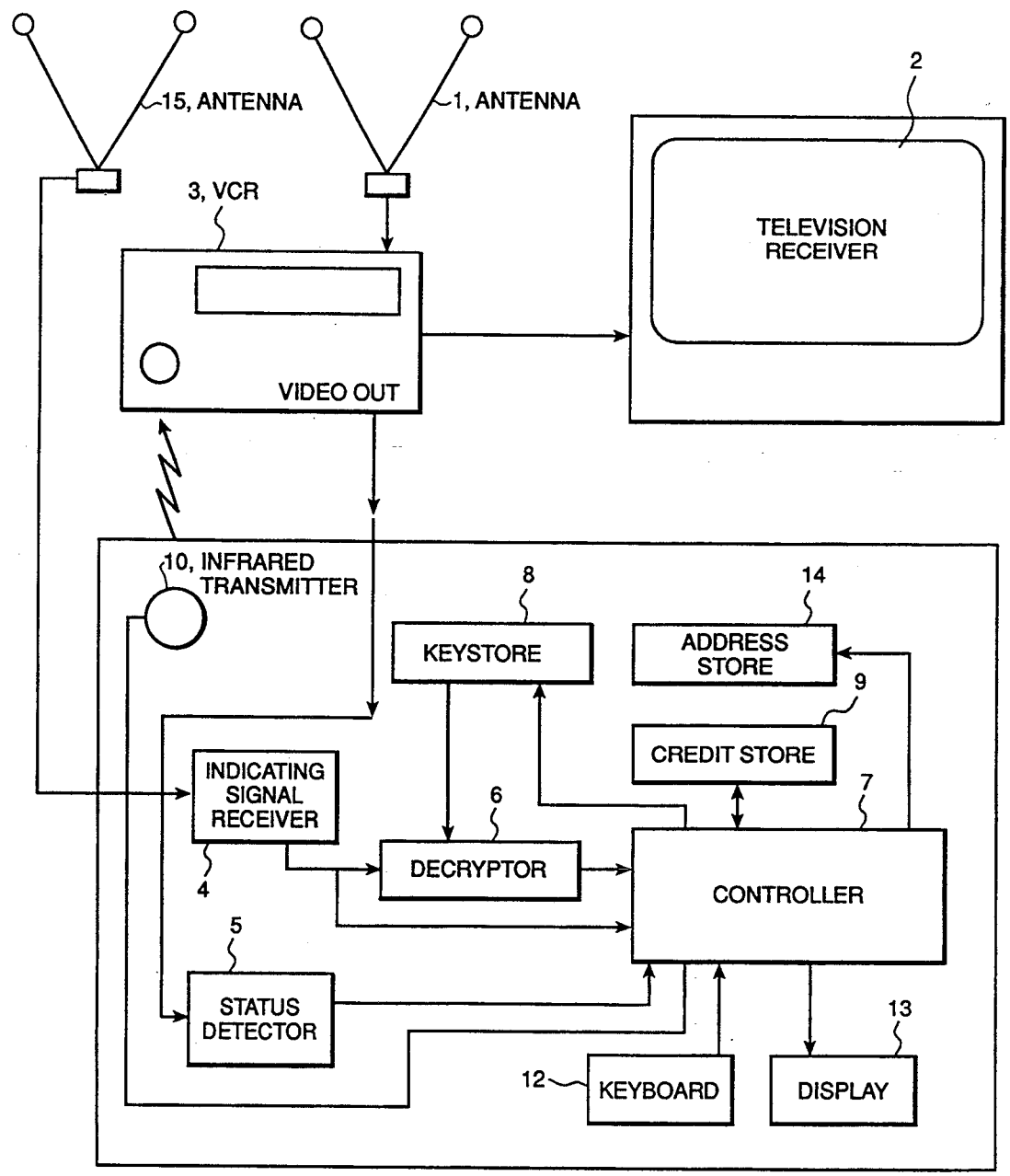
FIG. 2 is a block diagram of an embodiment in which the indicating signal is received from a source other than the programme broadcast.

Referring now to FIG. 2, a block diagram of a second embodiment of the invention is shown. This embodiment is similar to the first embodiment, except that the indicating signals which in the first embodiment are received along with the broadcast programme are in this case received from a source separate from the broadcast. This separate source is typically a radio transmitter operated by a party other than the broadcaster of the programme. In this case, signals indicating advent of non-programme material are generated by monitoring broadcasts and transmitting appropriate signals as changes in the broadcast occur. In this embodiment indicating signals are received by indicating signal receiver 4, via antenna 15, which may for convenience be the same antenna as antenna 1, and fed to decryptor 6 and controller 7. The indicating signals are similar to those of the first embodiment described above, except that additional data must be included to indicate to which one of many available channels of broadcast a particular indicating signal corresponds. Controller 7 uses this extra data to ensure that PAUSE signals are only generated when non-programme material indication is received corresponding to the channel of the broadcast being recorded, and that other indicating signals are ignored. The relevant channel can be requested from the user, who enters it via keyboard 12, or the channel can be automatically determined by status detector 5, using one of the well known techniques for this purpose. Operation of this embodiment is otherwise the same as in the case of the first embodiment.

The security functions of these embodiments of the invention will now be described with reference to FIG. 3.

As seen in FIG. 3, transmitter 309 is the means for transmitting the indicating signals and accounting signals of the invention. Indicating data 306 is a realtime signal indicating the nature of the programme currently being broadcast from a broadcasting station (not shown). This signal typically indicates whether the current broadcast is programme material or non-programme material, although more detailed information can also be provided, such as the name of the current programme. Indicating data 306 is fed to one input of function generator F2, which receives as a second input encryption key 301. The output of F2 is therefore an encrypted version of the indicating signal. The function F2 can be any one-to-one and onto mathematical function, the complexity of this function being one determinant of the security of the system. The output of F2 feeds one input of combiner 308. The other input of combiner 308 receives data from F1. F1 is a function generator which accepts as inputs:

1. Encryption key 301. This key can be changed from time to time to enhance security of the system.
2. Credit amount 302, entered by an operator at the administration center.
3. Serial number 303, entered by an operator at the administration center. The serial number is unique to each user's hardware.
4. Sequence number 304. This number is changed or incremented each time an accounting signal is generated. The controller at the user's home is arranged to store the sequence number (or the whole accounting signal) in memory each time credit is purchased. Each time credit is purchased, the controller only allows credit to be given if the stored number is different from the previous one. The purpose of this is to prevent users fraudulently re-using the same accounting message.

Function generator F1 performs a mathematical function using these four input variables such that the result is a unique value which, when processed by the inverse function at the receiving end, returns the input variables.

Combiner 308 combines the encrypted indicating and accounting signals, suitably labelling each type of signal. Transmitter 309 formats the combined signal into a serial bit stream. Synchronisation is achieved using a distinctive bit pattern to delineate data packets, which in this embodiment are 64 bits long. Receiver 310 receives the transmitted signal and feeds the received data to sync detector 310 and separator 311. Sync detector 310 detects the distinctive synchronising bit pattern at the beginning of each data packet, and provides at its output synchronising signals to separator 311. Separator 311 separates the accounting signals from the indicating signals. Accounting signals are fed to function generator F5, which also receives as an input a serial number, which in this embodiment is stored in read-only-memory. Function F5 generates at its outputs a credit amount, a sequence number and a decryption key, these values being those transmitted from the administration centre. The indicating signal from separator 311 is fed to one input of function generator F4, which accepts at its other input decryption key 316. Function generator F4 performs the; inverse of function generator F2, thereby recovering indicating data 306.

If deemed desirable, the invention can be adapted to transmit, at random intervals, an indicating signal which serves a decoy signal to frustrate attempts by unauthorised persons to use the signal. Decoy signals are identical to valid indicating signals, however a scheme is provided to ensure that decoy signals are ignored by authorised users' equipment, while causing erroneous operation of unauthorised persons' equipment. One such scheme is to use a key, similar to the decryption key, to indicate to the receiving controller the position of decoy signals within the received indicating signal stream.

According to a useful extension of any of the foregoing embodiments, the invention can be adapted to record information correlating usage with time, date and channel. This information is stored in memory means of the invention, for example non-volatile random-access-memory, and can be recalled periodically for statistical analysis. In particular, this information is of interest to advertisers who can deduce valuable commercial information from the percentage of users of the invention who choose to eliminate commercials at particular times and other usage patterns. It may also be desirable in some cases to distribute a portion of revenue from the service to advertisers or broadcasters according to the statistics gathered by this embodiment of the invention.

A further variation of these embodiment employs a charge-per-use credit management system, whereby credit is consumed according to the number of times the invention eliminates unwanted material. In this case, credit can be purchased in blocks of what are colloquially called "zaps", each zap corresponding to one segment of unwanted material eliminated. The number of zaps (credit units) purchased is stored in the credit store and each time the invention is enabled and unwanted material is removed, this number is decremented. As with other embodiments of the invention, the elimination function is inhibited once the credit reaches zero.

The foregoing describes only certain examples of the invention, and modifications obvious to those skilled in the art, can be made without departing from the scope of the invention. For example, whereas the embodiments above refer to the invention as controlling a video recorder, it can also be used for controlling video display means, so that viewers can view programmes without viewing non-programme material, charges being incurred in the same way as in the case of recording material uninterrupted. Also, while the recording means is described above as a VCR, any other recording means, such as video disk, can equally well be used. The method of charging for use of the service of the preferred embodiments above is only one method of many which can be used successfully. Any of the well known charging methods commonly applied to pay-per-view or subscription television schemes can be used without departing-from the scope of the present invention. Whereas in the embodiments described above credit is transmitted to the credit store of the apparatus via the same means as the indicating signal, it is envisaged that other systems can be used for this purpose. For example, credit can be transmitted by giving the user a number over the telephone which is keyed into the keyboard of the invention at the viewers' home. Control of the VCR, which in the case of the embodiments described above is achieved using an infra-red link, can be achieved in a number of well-known ways, including direct connection to the VCR, using, for example, a control bus. The invention can also be incorporated into a video recorder, television receiver, cable television or satellite television controller, or any other associated equipment.

INDUSTRIAL APPLICABILITY

The invention provides a system for enhancing enjoyment of certain television broadcasts by allowing viewers to disable display or recording of commercials and also a system for gaining revenue for provision of this service.

I claim:
1. A method of distributing television programmes comprising the steps of:
   A) Broadcasting a programme signal which represents television programmes interrupted by non-programme material;
   B) Encrypting a signal indicating broadcast of said non-programme material;
   C) Transmitting said encrypted indicating signal;
   D) Receiving said programme signal and said indicating signal at a receiving station;
   E) Selectively recording the received programme signal;
   F) Decrypting the received indicating signal;
   G) Determining if the decrypted indicating signal indicates reception of non-programme material;
   H) Determining whether the user is authorised to remove non-programme material;
   I) If the user is authorised and the decrypted indicating signal indicates non-programme material, pausing the selective recording of the programme signal until such time as said indicating signal indicates cessation of non-programme material; and
   J) If the user is not authorised, continuing the selective recording of said received programme signal.
2. A method of distributing television programmes comprising the steps of:
   A) Broadcasting a programme signal of a television programme interrupted by non-programme material;
   B) Encrypting a signal indicating broadcast of said non-programme material;
   C) Transmitting said encrypted indicating signal;
   D) Receiving said programme signal and said indicating signal at a receiving station;
   E) Recording the received programme signal;
   F) Decrypting the received indicating signal;
   G) Determining if the decrypted indicating signal indicates reception of non-programme material;
   H) Testing stored data representing an amount of credit, and if the said amount exceeds a predetermined value:
      i) Pausing the recording of the programme whenever said indicating signal indicates non-programme material, and
      ii) Reducing a value of the stored data representing an amount of credit in response to said pausing step.
3. A method of distributing television programmes according to claim 2 wherein the value of the stored data representing an amount of credit is reduced by an amount proportional to the duration of the pausing of the recording.
4. A method of distributing television programmes according to claim 2 wherein the value of the stored data representing an amount of credit is reduced by subtracting a prescribed value from the stored data each time recording is paused.
5. A television, programme distribution system comprising:
   a broadcasting station including
      A) Means for broadcasting a programme signal which represents television programmes interrupted by non-programme material;
      B) Means for encrypting a signal indicating broadcast of said non-programme material; and
      C) Means for transmitting said encrypted indicating signal and a receiving station including
- A) Means for receiving said programme signal and said encrypted indicating signal;
- B) Means for selectively recording said received programme signal;
- C) Means for decrypting said received indicating signal;
- D) Means for storing data indicating whether said receiving station is authorised to remove non-programme material; and
- E) Control means for pausing the selective recording of the received programme signal, while said decrypted indicating signal indicates non-programme material is being received by said means for receiving, if the stored data indicates that the user is authorised, and for continuing the selective recording said received signal if the stored data indicates that the user is not authorised.

6. A television programme distribution system comprising:
a broadcasting station including
- A) Means for broadcasting a programme signal of a television programme interrupted by non-programme material;
- B) Means for encrypting a signal indicating broadcast of said non-programme material; and
- C) Means for transmitting said encrypted indicating signal; and a receiving station including
- A) Means for receiving said programme signal and said encrypted indicating signal;
- B) Means for recording said received programme signal;
- C) Means for decrypting said received indicating signal;
- D) Means for storing data representing an amount of credit;
- E) Control means for pausing the recording of the received programme signal, while said decrypted indicating signal indicates non-programme material is received, if said stored data representing an amount of credit exceeds a predetermined amount; and
- F) Means for reducing a value of the stored data representing an amount of credit in response to a pausing operation initiated by said control means.

7. A television programme distribution system according to claim 6 wherein said means for reducing a value of the stored data representing an amount of credit in response to the pausing operation initiated by said control means reduces said value by an amount proportional to the duration of pausing of the recording.

8. A television programme distribution system according to claim 6 wherein said means for reducing a value of the stored data representing an amount of credit in response to a pausing operation initiated by said control means reduces said value by subtracting a prescribed value from the stored data each time recording is paused.

9. A television signal recording control system comprising:
- A) A television signal receiver for receiving a television signal;
- B) A recorder for recording a television signal received by said television signal receiver;
- C) An indicating signal receiver for receiving an encrypted indicating signal;
- D) A signal decryptor for decrypting said received encrypted indicating signal;
- E) Credit memory means for storing data indicating an amount of credit; and
- F) A controller generating a recording pause signal for pausing said recorder when the decrypted indicating signal indicates reception of non-programme material by said television signal receiver and the data stored in said credit memory means indicates that the user is authorised to pause said recorder.

10. A television signal recording control system comprising:
- A) A television signal receiver for receiving a television signal;
- B) A recorder for recording a television signal received by said television signal receiver;
- C) A receiver for receiving an encrypted indicating signal;
- D) A signal decryptor for decrypting said received encrypted indicating signal;
- E) Means for storing data representing an amount of credit;
- F) Control means for generating a recording pause signal, for pausing said recorder when said decrypted indicating signal indicates non-programme material is received by said television signal receiver, if said stored data representing an amount of credit exceeds a predetermined amount; and
- G) Means for reducing a value of the stored data representing an amount of credit in response to said recording pause signal generation.

11. A television programme recording control system according to claim 10 wherein said means for reducing a value of the stored data representing an amount of credit in response to said recording pause signal generation reduces said value by an amount proportional to the duration of pausing of recording.

12. A television programme recording control system according to claim 10 wherein said means for reducing a value of the stored data representing an amount of credit in response to said recording pause signal generation reduces said value by subtracting a prescribed value from the stored data each time recording is paused.

13. A method of distributing television programmes comprising the steps of:
- A) Broadcasting a programme signal which represents television programmes interrupted by non-programme material;
- B) Encrypting a signal indicating broadcast of said non-programme material;
- C) Transmitting said encrypted indicating signal;
- D) Receiving said programme signal and said indicating signal at a receiving station;
- E) Selectively displaying a program responsive to the received programme signal;
- F) Decrypting the received indicating signal;
- G) Determining if the decrypted indicating signal indicates reception of non-programme material;
- H) Determining whether the user is authorised to remove non-programme material; and
- I) If the user is authorised and the decrypted indicating signal indicates non-programme material, disabling the selective display of the programme until such time as the decrypted indicating signal indicates cessation of non-programme material; and J) If the user is not authorised, continuing the selective display of said programme responsive to said received signal.

14. A method of distributing television programmes comprising the steps of:
   A) Broadcasting a programme signal of a television programme interrupted by non-programme material;
   B) Encrypting a signal indicating broadcast of said non-programme material;
   C) Transmitting said encrypted indicating signal;
   D) Receiving said programme signal and said indicating signal at a receiving station;
   E) Displaying a programme responsive to the received programme signal;
   F) Decrypting the received indicating signal;
   G) Determining if the decrypted indicating signal indicates reception of non-programme material;
   H) Testing stored data representing an amount of credit, and if said amount exceeds a pre-determined value:
      i) Disabling display of the programme whenever said decrypted indicating signal indicates non-programme material, and
      ii) Reducing a value of the stored data representing an amount of credit in response to said disabling step.

15. A method of distributing television programmes according to claim 14 wherein the value of the stored data representing an amount of credit is reduced by an amount proportional to the duration of disabling of display.

16. A method of distributing television programmes according to claim 14 wherein the value of the stored data representing an amount of credit is reduced by subtracting a prescribed value from the stored data each time display is disabled.

17. A television programme distribution system comprising:
   a broadcasting station including
      A) Means for broadcasting a programme signal which represent television programmes interrupted by non-programme material;
      B) Means for encrypting a signal indicating broadcast of said non-programme material; and
      C) Means for transmitting said encrypted indicating signal; and
   a receiving station including
      A) Means for receiving said programme signal and said encrypted indicating signal;
      B) Means for selectively displaying a programme responsive to said received programme signal;
      C) Means for decrypting said received indicating signal;
      D) Means for storing data indicating whether said receiving station is authorised to remove non-programme material; and
      E) Control means for disabling the selective display of the programme, while said decrypted indicating signal indicates non-programme material is received, if the stored data indicates that the user is authorised, and for causing the selective display of the programme if the stored data indicates that the user is not authorised.

18. A television programme distribution system comprising:
   a broadcasting station including
      A) Means for broadcasting a programme signal of a television programme interrupted by non-programme material;
      B) Means for encrypting a signal indicating broadcast of said non-programme material; and
      C) Means for transmitting said encrypted indicating signal; and
   a receiving station including
      A) Means for receiving said programme signal and said encrypted indicating signal;
      B) Means for displaying a programme responsive to said received programme signal;
      C) Means for decrypting said received indicating signal;
      D) means for storing data representing an amount of credit;
      E) Control means for disabling display of the programme, while said decrypted indicating signal indicates non-programme material is received, if said stored data amount of credit exceeds a pre-determined amount; and
      F) Means for reducing a value of the stored data representing an amount of credit in response to said disabling operation initiated by said control means.

19. A television programme distribution system according to claim 18 wherein said means for reducing a value of the stored data representing an amount of credit in response to said disabling operation initiated by said control means reduces said value by an amount proportional to the duration of disabling of display.

20. A television programme distribution system according to claim 18 wherein said means for reducing a value of the stored data representing an amount of credit in response to said disabling operation initiated by said control means reduces said value by subtracting a prescribed value from the stored data each time display is disabled.

21. A television programme display control system for controlling the display for a received television programme signal on a display, said system comprising:
   A) A receiver for receiving an encrypted indicating signal;
   B) A signal decryptor for decrypting said encrypted indicating signal;
   C) Credit memory means for indicating an amount of credit; and
   D) A controller for disabling the display of the received signal while the decrypted indicating signal indicates reception of non-programme material and the data stored in said credit memory means indicates that the user is authorised to disable said display.

22. A television programme display control for controlling the display of received television programme signals, said control comprising:
   A) A receiver for receiving an encrypted indicating signal;
   B) A signal decryptor for decrypting said encrypted indicating signal;
   C) Means for storing data representing an amount of credit;
   D) Control means for generating a display disabling signal for disabling display of said received signals, while said indicating signal indicates non-programme material in said received programme signals, if said stored data representing an amount of credit exceeds a predetermined amount; and E) Means for reducing a value of the stored data representing an amount of credit in response to the disabling operation initiated by said control means.

23. A television programme display control system according to claim 22 wherein said means for reducing a value of the stored data representing an amount of credit in response to said disabling operation initiated by said control means reduces said value by an amount proportional to the duration of disabling of display.

24. A television programme display control system according to claim 22 wherein said means for reducing a value of the stored data representing an amount of credit in response to said disabling reduces said value by subtracting a prescribed value from the stored data each time display is disabled, 25. The method of claim 1, wherein step J) comprises a step of, if the user is not authorised and said decrypted indicating signal indicates non-programme material, continuing to record said programme signal.

26. The method of claim 13, wherein step J) comprises a step of, if the user is not authorised and said decrypted indicating signal indicates non-programme material, continuing to display said programme responsive to said received signal.

27. The system of claim 5 wherein said control means is for causing the selective recording of the programme signal if the stored data indicates that the user is not authorised and the decrypted indicating signal indicates that non-programme material is being received.

28. The system of claim 17, wherein said control means is for causing the selective display of the programme signal if the stored data indicates that the user is not authorised and the decrypted indicating signal indicates that non-programme material is being received.

29. The method of claim 1, wherein step J) comprises a step of, if the user is not authorised and said decrypted indicating signal indicates programme material, continuing to record said programme responsive to said received signal.

30. The method of claim 13, wherein step J) comprises a step of, if the user is not authorised and said decrypted indicating signal indicates programme material, continuing to display said programme responsive to said received signal.

31. The system of claim 5 wherein said control means is for causing the selective recording of the programme signal if the stored data indicates that the user is not authorised and the decrypted indicating signal indicates that programme material is being received.

32. The system of claim 17, wherein said control means is for causing the selective display of the programme signal if the stored data indicates that the user is not authorised and the decrypted indicating signal indicates that programme material is being received.

33. A system according to any one of claims 5–12, 27 or 31 and further comprising memory means for recording the time and date at which the recording is paused and the channel of a broadcast which is recorded.

34. A system according to any one of claims 17–24, 28 or 32 and further comprising memory means recording the time and date at which the display is disabled and the channel of a broadcast which is recorded.

35. A method as in any one of claims 1–4, 13–16, 29, 30, 33 or 34 further comprising the step of transmitting decoy signals, which are similar to said indicating signal, but which do not indicate non-programme material.

36. A method as in any one claims 1–4, 13–16, 29, 30, 33 or 34 wherein:
A) The encrypting step comprises the step of transmitting decoy signals, which are similar to said indicating signal, but which do not indicate non-programme material, said decoy signals being transmitted at times determined by the value of an encryption key; and
B) The decrypting step comprises the step of identifying said decoy signals according to the value of said encryption key.

* * * * *